UNITED STATES PATENT OFFICE.

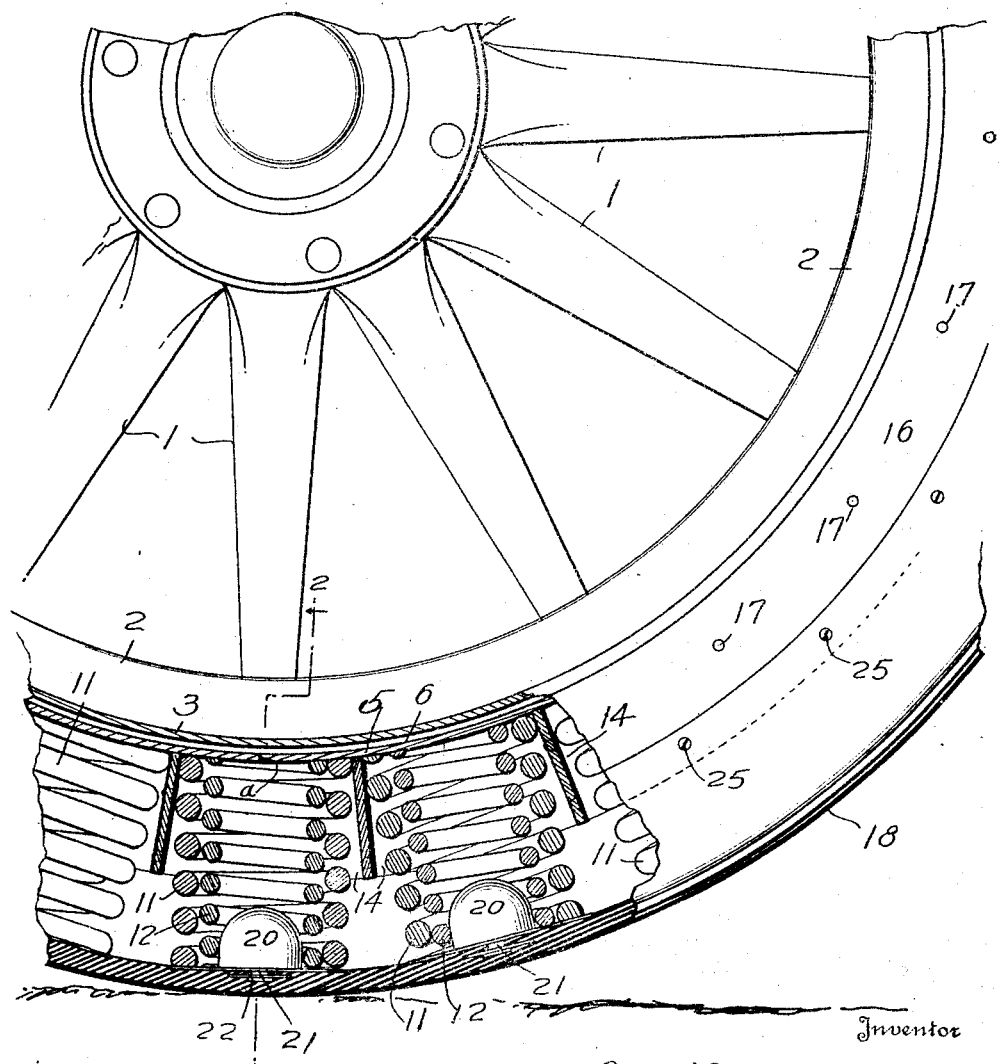

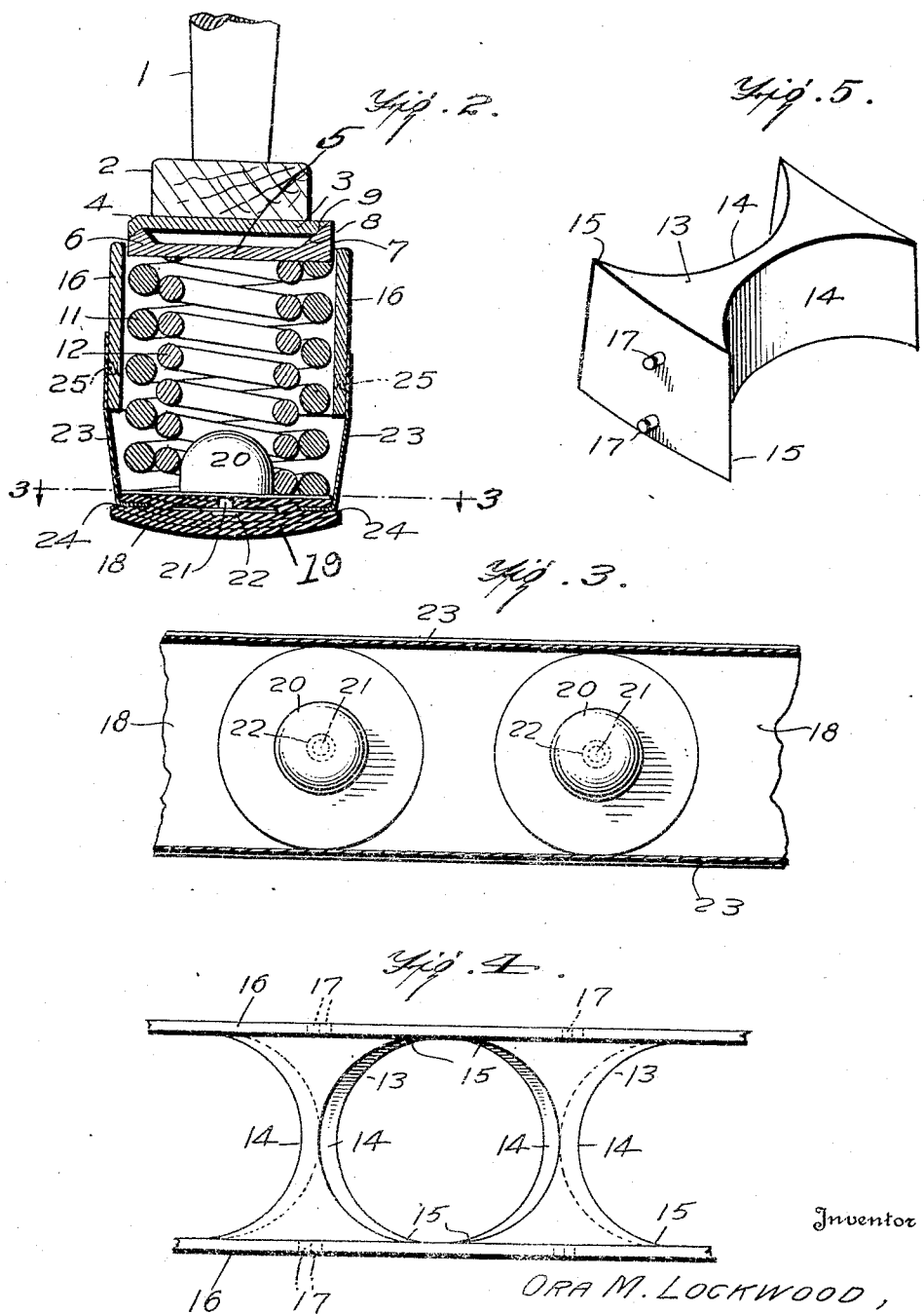

ORA M. LOCKWOOD, OF BUFFALO, NEW YORK.

RESILIENT TIRE.

1,366,696.

Specification of Letters Patent.  Patented Jan. 25, 1921.

Application filed March 31, 1920. Serial No. 370,228.

*To all whom it may concern:*

Be it known that I, ORA M. LOCKWOOD, a citizen of the United States, residing at Buffalo, in the county of Erie and State of New York, have invented certain new and useful Improvements in Resilient Tires, of which the following is a specification, reference being had to the accompanying drawings.

This invention relates to an improved resilient tire for vehicle wheels particularly those used in connection with motor driven vehicles, especially trucks and the like, and an object of the invention is to provide a substitution for generally used pneumatic tires.

Another object involves a pair of rim members, one engaging over the other and one engaging with the felly, in combination with a pliable tread and resilient means between the tread and one of the rim bands, with retaining members for the resilient means, said foregoing parts being so constructed and arranged as to withstand all lateral strains, as well as the strains created on the parts due to the driving connection between the tread and the felly.

Still another object consists in the provision of means for retaining the resilient means in their necessary circumferential arrangement with respect to the rim band and the tread, in combination with means for holding the resilient means uniformly spaced and which latter means also acts as a circumferential driving medium between the springs and the rim bands of the felly of the wheel.

A further object embodies the provision of means for retaining the resilient means in relatively fixed positions to the tread and also acting as a driving medium between the resilient means and the tread.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view of a portion of a vehicle wheel, showing a part of the tire in elevation and a part in section showing the resilient means connecting between the felly and the tread of the wheel, Fig. 2 is a cross sectional view on line 2—2 of Fig. 1, Fig. 3 is a sectional view on line 3—3 of Fig. 2, Fig. 4 is a plan view showing the edges of the opposing ring plates with several of the spacing members interposed therebetween, Fig. 5 is an enlarged detail view of one of the spacing members.

Referring more especially to the drawings, 1 designates the vehicle wheel as a whole including a felly 2. A rim 3 is secured to the felly by any well known means (not shown). This rim has an annular flange 4 and 5 denotes the rim band, which is arranged about the rim 3. The rim band upon one of its edges is provided with an annular enlargement 6, which coöperates with the flange 4 to prevent movement of the rim band in one direction. The other edge of the rim band has an annular flange 7, which is beveled as at 8, to coöperate with the bevel 9 of the rim. The rim band is designed to be retained on the rim by any suitable well known means (not shown). However, this rim band is split as shown, in fact it is provided with at least one joint *a*, consisting of the alined ends of the band. By providing a split band of this kind it is possible for the band to be expanded to apply the band on the rim 3 and contracted in order to permit the removal of the resilient means and the resilient means retaining parts.

Engaging upon the outer face of the rim band is a plurality of coil springs 11 and 12, the former being in surrounding relation to the latter, and the spring 11 is designed to be constructed of spring material larger in diameter than the material of the spring 12, though both springs may be constructed of other material of different diameters.

In order to hold the resilient means in position and properly spaced, spacing members 13 are arranged in contact with the rim band. Each spacing member is in the form of a single body and is provided with opposite semicircular concavities 14 which embrace the springs 11. These spacers are arranged as shown clearly in Fig. 4, and the ends 15 of their flanges are disposed to approximate each other as shown in Fig. 4. However, the ends 15 of one spacer does not contact with the corresponding ends of an adjacent spacer, but they are very close thereto. Furthermore the ends 15 of the spacers blend or merge into the adjacent faces of the retaining rings 16, which are disposed on opposite sides of the tire. The retaining rings 16 at their inner edges overlie the rim band. The side faces of the spacers are provided with projecting lugs or pins 17 which pass through the side rings 16, so as to retain the spacers in position. The ends of these lugs 17 are designed to be swaged or otherwise headed so as to hold them connected to the retaining rings, thereby not only holding the rings 16 in place, but also holding the spacers. Since the spacers are fixed in this manner relatively to the rings 16, the rim band 5 will frictionally engage the inner faces of the spacers, thereby acting as the circumferential driving medium between the spacers, the rim band and the springs 11 and 12. The retaining rings 16 act to hold the springs in circumferential arrangement and at the same time coacting with the spacers to prevent lateral movement of the springs. In fact, by means of the spacers and the rings 16, all the lateral strains as well as those in the direction of the rotation of the wheel are taken care of, especially in view of the fact that the rings overlie the rim band and that the rim band is designed to be fixed relatively to the rim 3 by any well known means not shown.

Engaging about the outer ends of the springs is a suitable tread 18. This tread is designed to be constructed of any suitable pliable material preferably rubberized patent fabric laminations 19 and is designed to function not unlike the tread surface of the common pneumatic tire. Furthermore this tread affords the bridging effect that is usually obtained by the pneumatic tire, particularly in the flatness of the edge that comes in contact with the ground, and particularly since it is supported by the plurality of resilient springs, the laminations of rubberized cotton fabric in practice are designed to be secured together by any suitable binder and vulcanized into a common mass or may be made of any other suitable material. However, it is the aim to rubberize whatever material that may be used in the construction of the tread, and also to use a binder to secure the laminations together and thereby construct a tire having a thickened mass with which the springs engage and which may coöperate with the springs. It will be noted that this tread will give, in other words, will yield as will the usual pneumatic tire and accommodate itself to the irregularities of the road bed, and will then automatically reseat itself, and act mobile in use. The outer surface of the tread is slightly convexed very much resembling the curvature of the tread portion of the pneumatic tire, and its action upon the road bed greatly corresponds to the action of a pneumatic tire on the road bed.

Carried by the inner face of the tread is a plurality of centering devices, such as projections 20, the inner ends of which are rounded and are designed to extend substantially within the inner resilient springs as to retain the springs in place, namely to hold them centered as well as relatively mobile with respect to the other parts of the tire. These centering devices or elements have projecting pins or lugs 21, which are headed as shown at 22. These headed members or lugs 21 are embedded or vulcanized in the tread during its construction so that the centering devices are permanently and fixedly carried by the tread. It is obvious that by means of the centering devices, the springs are maintained in position, particularly with respect to the tread, and in view of the spacers and the retaining rings 16, it will be noted how the springs are retained in position with respect to the rim band.

In order to exclude dust, dirt and the like from the interior of the tire and thereby increasing the durability of the same as a whole, pliable straps or pieces 23 are vulcanized or otherwise secured to the tread as at 24. These pliable pieces or straps cover the outer side portions of the springs, and overlie the rings 16 and are secured by screws or other suitable devices 25 to the rings 16. By excluding dust, dirt or other refuse from the interior of the tire, the various parts will remain intact longer than if the spaces between the tread and the outer edges of the rings 16 should be left open. Furthermore, the pliable material or straps 23 may be constructed of any substance which is exceedingly durable. Although it is the design to put a certain amount of rubber in these straps, during the construction of the same, it is not the aim to construct them entirely of rubber. In fact, these straps may be constructed of a fabric material and rubber excluded if so desired.

The ring band 5 when applied is slipped over the rim 3. However, after sliding the rim band 5 from the rim 3 the rim band 5 may be contracted by permitting the ends of the rim band to overlap and slide relatively to each other, whereby the rim band 5 may be contracted sufficiently to permit the band to be removed through either of the rings 16. When the rim band is thus removed, the springs may be easily detached, and the other parts of the tire may be then disassembled and necessary repairs made.

The invention having been set forth, what is claimed as new and useful is:—

1. In a resilient tire, the combination with a felly, of a rim secured thereto, and a rim band thereon, a tread in surrounding spaced relation with respect to the rim band, resilient means spaced between the tread and the rim band, spacing members between the resilient means, opposing rings secured to the spacers thereby holding them in relative positions, and overlying the rim band, thereby retaining the various parts in place, and a pliable covering extending from the tread to the rings.

2. In a resilient tire as set forth, a felly engaged rim, a rim band engaging said rim, opposing rings adjacent to and overlying the opposite edges of the rim band, spacers arranged between the rings and connecting the same, resilient means disposed between the spacers, and a pliable wheel tread engaging about and connected to the outer ends of the resilient means.

3. In a resilient tire, a felly engaged rim, a rim band engaging therewith, a plurality of resilient means extending radially from the rim band, opposing rings overlying the rim band to maintain the resilient means in circumferential arrangement, spacers connecting said rings and having opposite semi-circular concavities to engage and receive the resilient means, thereby acting to hold the resilient means equally spaced, a pliable tread engaging about the resilient means and having centering elements for engagement with the resilient means.

4. In a resilient tire, a rim element, resilient means extending radially therefrom, opposing rings having parts overlying said rim element, spacers connecting the rings and being interposed between the resilient means for equally spacing them, a tread engaging about the resilient means, means for retaining the resilient means connected to the tread, and pliable straps connecting the tread and the rings respectively.

5. In a resilient tire, a felly engaged rim, a rim band engaging said rim, opposing rings adjacent to and overlying the opposite edges of the rim band, a plurality of spacers having opposite semi-cylindrical cavities, said spacers being interposed between said rings and being connected thereto in sequence about and resting upon the rim band, whereby the semi-cylindrical cavities oppose each other to form spring receiving pockets, said pockets having their walls converging radially toward the center of the wheel, a plurality of springs arranged in pairs engaging said pockets, the springs of each pair telescoping, a pliable tread in surrounding relation with the outer ends of the springs and having means engaging within the outer ends of the springs to retain the pliable tread in position, and covering members connected to the opposite edges of the tread and in turn connected to the opposing rings and adapted to flex according to the actions of the tread.

In testimony whereof I hereunto affix my signature.

ORA M. LOCKWOOD.